United States Patent
Negley et al.

(10) Patent No.: US 7,681,923 B2
(45) Date of Patent: Mar. 23, 2010

(54) FITTING AND ASSOCIATED GROMMET FOR SUPPORTING A CONDUIT PENETRATING A PANEL

(75) Inventors: Mark A. Negley, Bellevue, WA (US); Rangasamy Elangovan, Bothell, WA (US); Yuri Tian, Mukilteo, WA (US); Eric H. Nelson, Bothell, WA (US); Paul S. Gregg, Seattle, WA (US); Michael A. Ross, Lake Stevens, WA (US)

(73) Assignee: The Boeing Company, Chicago, IL (US)

(*) Notice: Subject to any disclaimer, the term of this patent is extended or adjusted under 35 U.S.C. 154(b) by 670 days.

(21) Appl. No.: 11/561,088

(22) Filed: Nov. 17, 2006

(65) Prior Publication Data
US 2008/0116319 A1    May 22, 2008

(51) Int. Cl.
*F16L 3/04* (2006.01)
(52) U.S. Cl. .................. 285/139.1; 285/139.2; 285/213; 285/109
(58) Field of Classification Search .............. 285/139.1, 285/139.2, 139.3, 136.1, 213, 215, 217, 345, 285/109, 346; 29/523, 522.1
See application file for complete search history.

(56) References Cited

U.S. PATENT DOCUMENTS

| | | | |
|---|---|---|---|
| 3,368,830 A * | 2/1968 | French | 285/110 |
| 3,686,747 A | 8/1972 | Bagnulo | |
| 3,984,132 A | 10/1976 | Sarson | |
| 4,126,339 A * | 11/1978 | Thompson | 285/369 |
| 4,654,747 A | 3/1987 | Covey | |
| 5,383,688 A * | 1/1995 | Berry | 285/49 |
| 5,704,656 A * | 1/1998 | Rowe | 285/93 |
| 6,015,169 A * | 1/2000 | Funke et al. | 285/136.1 |
| 6,241,199 B1 * | 6/2001 | Ismert | 248/56 |
| 2006/0099843 A1 | 5/2006 | Fullner et al. | |

FOREIGN PATENT DOCUMENTS

WO    WO2006/049956 A1    5/2006

* cited by examiner

*Primary Examiner*—David E Bochna
(74) *Attorney, Agent, or Firm*—Alston & Bird LLP

(57) ABSTRACT

A fitting and an associated grommet are provided for supporting a conduit penetrating a panel and limiting energy transfer between the conduit and panel. The fitting may include a grommet having annular first and second sections spaced apart from one another and an annular wall extending between the first and second sections such that the wall and first and second sections define a bore. A plurality of ribs protrude from the annular wall, the ribs being distributed circumferentially around the annular wall and spanning between the first and second sections. A tubular liner extends through the bore of the grommet and contacts the first and second sections. The plurality of ribs extend into the bore, and at least some of the ribs contact the liner.

24 Claims, 4 Drawing Sheets

FITTING AND ASSOCIATED GROMMET FOR SUPPORTING A CONDUIT PENETRATING A PANEL

FIELD OF THE INVENTION

Embodiments of the present invention are generally directed to fittings and associated grommets for supporting a conduit penetrating a panel, and, more particularly, to fittings and grommets for limiting thermal and/or noise propagation therethrough.

BACKGROUND OF THE INVENTION

Traditionally, commercial airplanes were constructed with fuselage structures composed mainly of aluminum. These airplanes were often designed such that multiple tubes carrying hydraulic fluid were required to penetrate the fuselage at different points. Often, fittings were included at these penetration points to facilitate passage of the tubes through the fuselage and to provide for proper attachment of the hydraulic tubes to the fuselage structure in a way that restrained tube movement and prevented damage to both the tube and structure. In addition, in cases where the fuselage was pressurized, these fittings were designed to minimize the leakage through the penetration hole of the tube. Finally, the fitting served the additional purpose of facilitating aircraft assembly and servicing by acting as a connector for tubes being connected from outside the fuselage, thereby allowing external portions of the tubes to be connected and disconnected without significant disruption of the fuselage structure.

In more recent times, commercial airplanes in increasing numbers are being designed and constructed with composite fuselage and wing structures, meaning these structures incorporate components of metal and components composed of other materials. Some of the most common non-metallic materials to be used in aircraft construction are polymer-based materials. These materials are relatively inexpensive and lightweight while at the same time providing sufficient strength for many applications, and as such, designers are making significant use of those materials.

While polymer-based materials offer several advantages in aircraft construction, they also create several challenges. Presently, titanium hydraulic system tubes are used to transport hydraulic fluid through polymer-based thermoset composite fuselages. At certain instances, the fluid in these tubes may have operating temperatures high as 275° F. Using standard fittings designed for aluminum fuselages, the penetration of these tubes through the fuselage skin can lead to localized areas near the penetration hole with temperatures elevated to a point where thermoset composite material aging and degradation is a concern. As such, a need in the art for a new fitting that allows tube penetration through a thermoset composite fuselage while avoiding excessive localized heating.

Another challenge presented by the use of polymer-based materials in aircraft construction is the unwanted transmission of vibrational energy. Hydraulic system components, such as motors, pumps, and actuators, tend to vibrate as they operate. These vibrations may be transmitted along the hydraulic tubes leading to and away from the hydraulic components. When the hydraulic tubes pass through and come in contact with the fuselage, some of the vibrational energy may be transmitted to the fuselage. Additionally, because the hydraulic tubes are carrying a fluid, some of the energy associated with the movement of the fluid may be also transmitted to the fuselage. This vibrational energy may cause the fuselage to vibrate and produce noise in the fuselage. In the past, the damping capacity of the aluminum plane structures was sufficient to maintain the vibration-induced fuselage noise at an acceptable level. However, the capacity of composite fuselage structures to dampen mechanical vibrations is less than that of the aluminum structures, mainly due to the characteristics of the materials used in the composite fuselages. Hence, there is a need in the art for a new fitting that will dampen vibrations being transmitted from hydraulic tubes to composite fuselages through which the tubes are penetrating.

SUMMARY OF THE INVENTION

Embodiments of the present invention address at least some of the needs described above while providing still additional advantages. In this regard, a fitting and an associated grommet are provided that effectively limit heat transfer from a conduit that passes through or is otherwise attached to the fitting to the surrounding structure. Additionally, a fitting and associated grommet are provided that dampen vibrations from a conduit that passes through or is otherwise attached to the fitting to the surrounding structure.

In one embodiment, a fitting is provided for supporting a conduit penetrating a panel and limiting energy transfer between the conduit and panel. The fitting may include a grommet having annular first and second sections spaced apart from one another and an annular wall extending between the first and second sections such that the wall and first and second sections define a bore. A plurality of ribs protrude from the annular wall. The ribs are distributed circumferentially around the annular wall and span between the first and second sections. A tubular liner extends through the bore of the grommet and contacts the first and second sections. The plurality of ribs extends into the bore, and at least some of the ribs contact the liner.

In another embodiment, an air vehicle is provided that includes a fuselage having a fuselage panel with at least one conduit extending through the fuselage panel and a fitting, such as described above, that is disposed between the fuselage panel and the conduit. A grommet, such as that employed by the aforementioned fitting, is also provided by another aspect of the present invention. As a result of the construction of the grommet and the resulting fitting, the grommet and the resulting fitting may limit thermal transfer and/or vibrations to the surrounding structure, such as the fuselage of an aircraft.

BRIEF DESCRIPTION OF THE DRAWINGS

Figure 1:
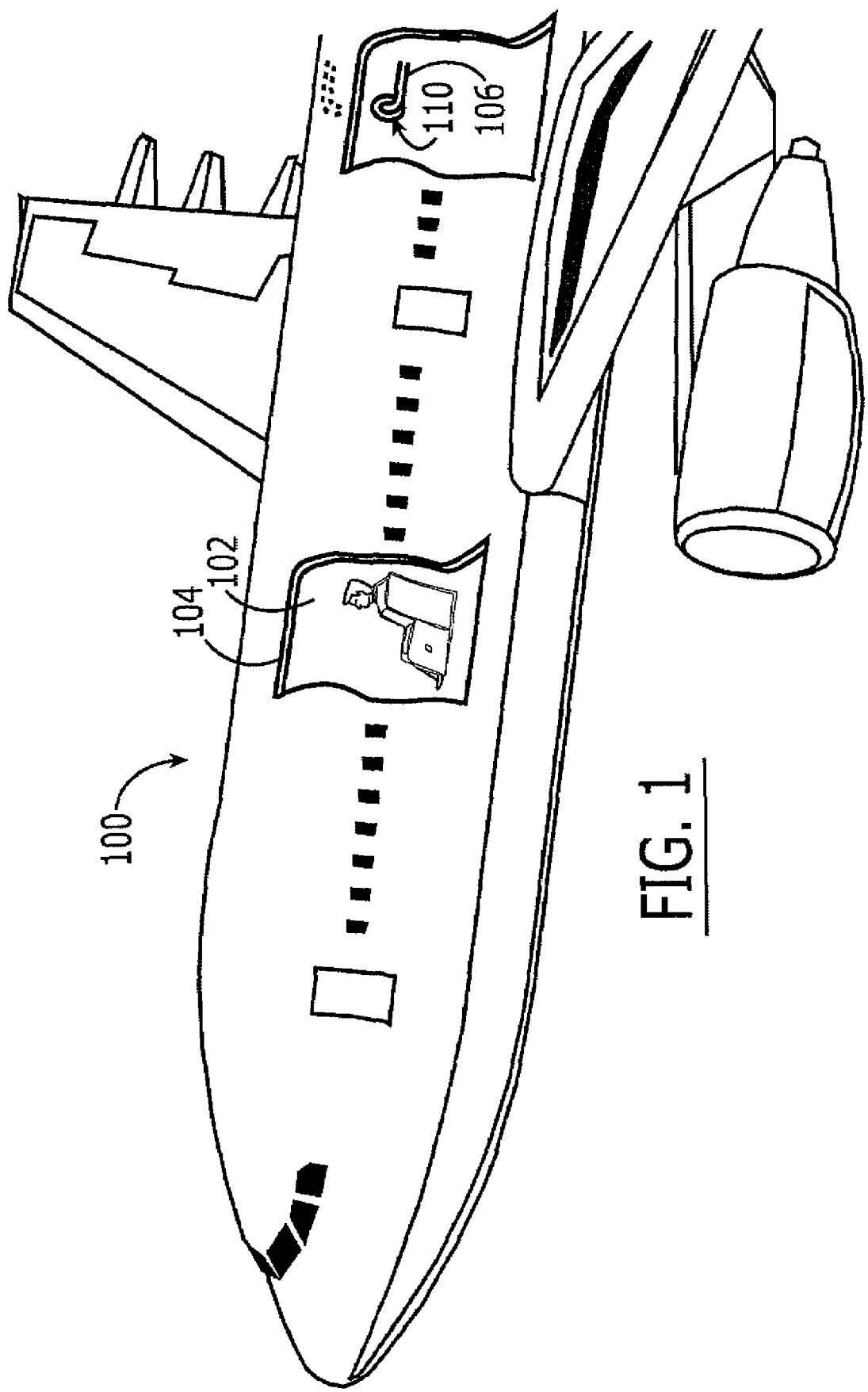
Figure 2:
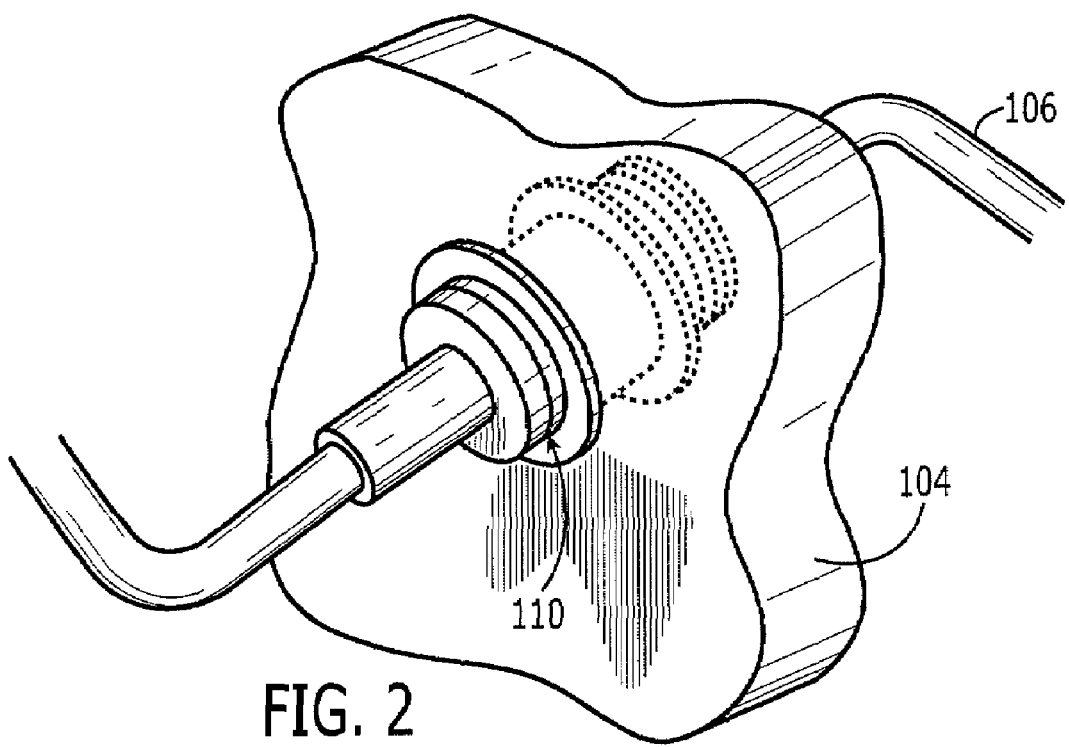
Figure 3:
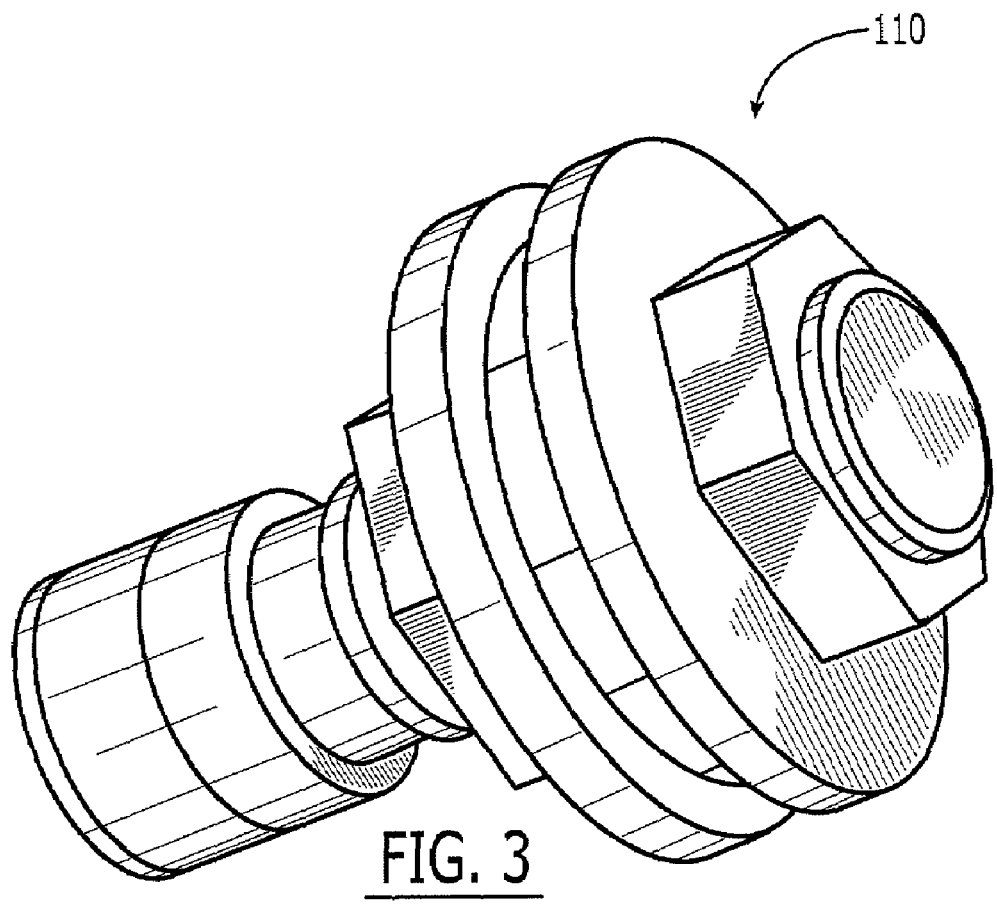
Figure 4:
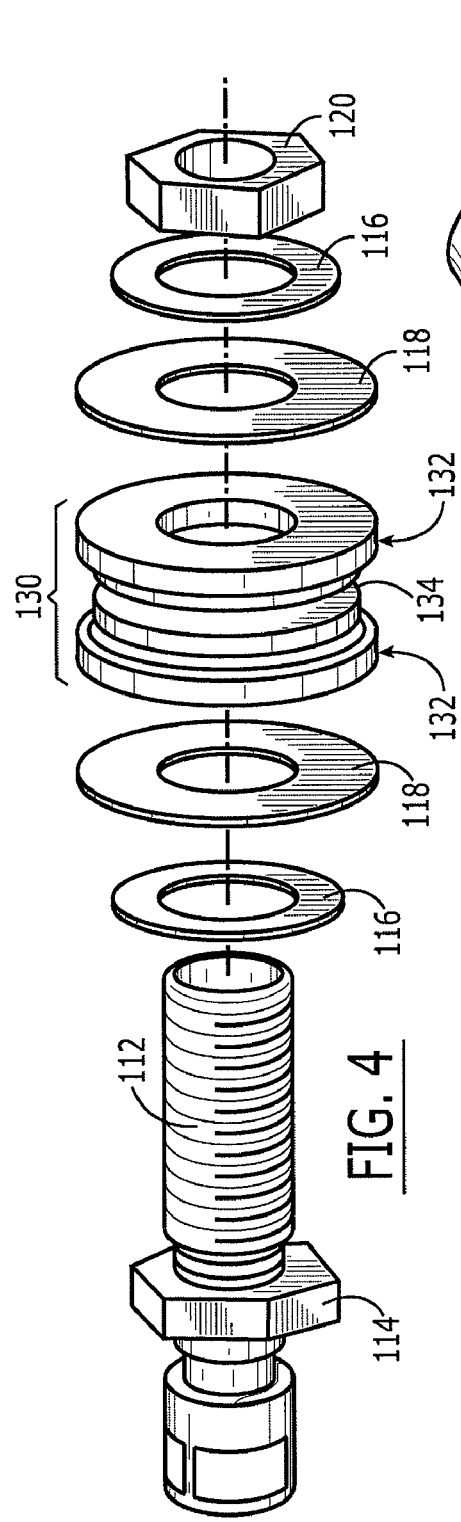
Figure 6:
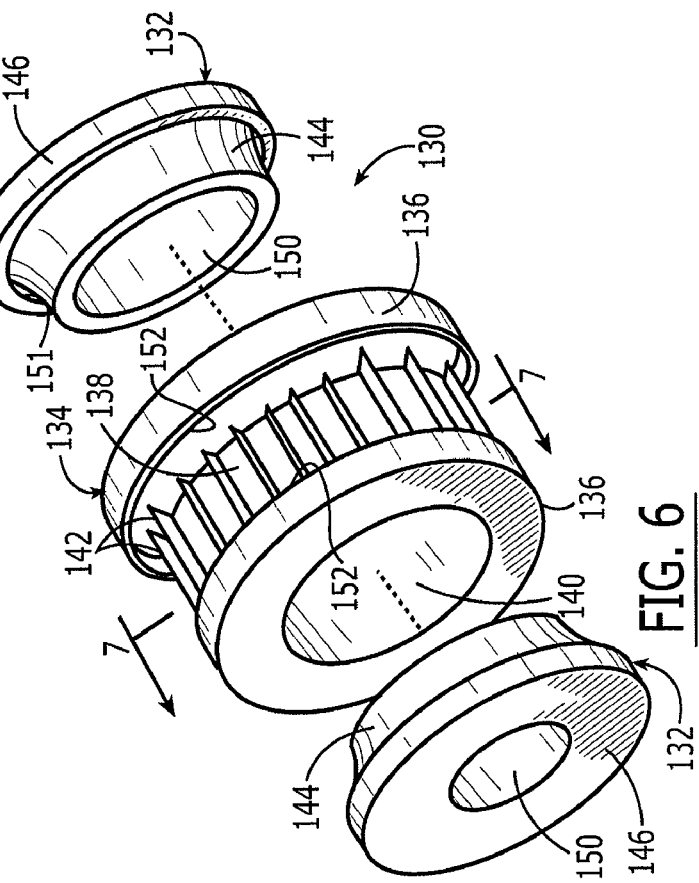
Figure 5:
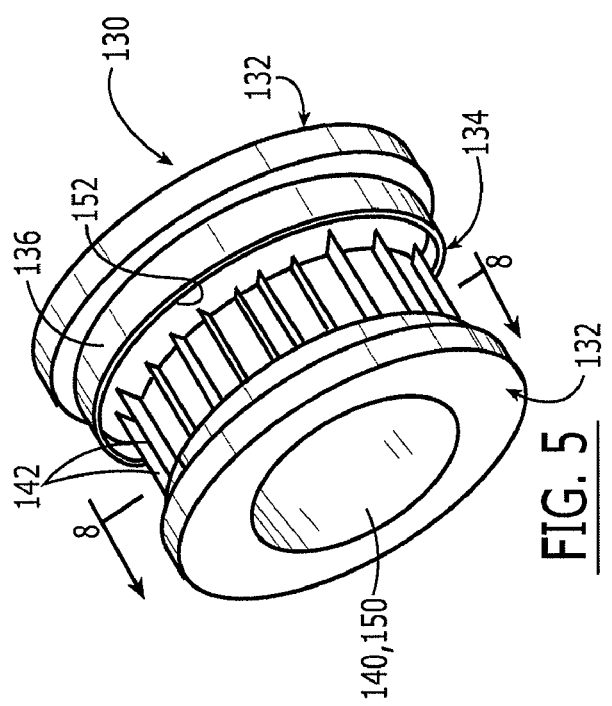
Figure 7:
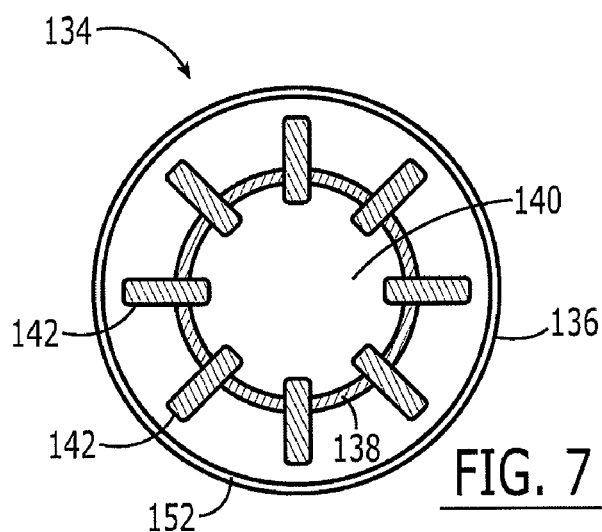
Figure 8:
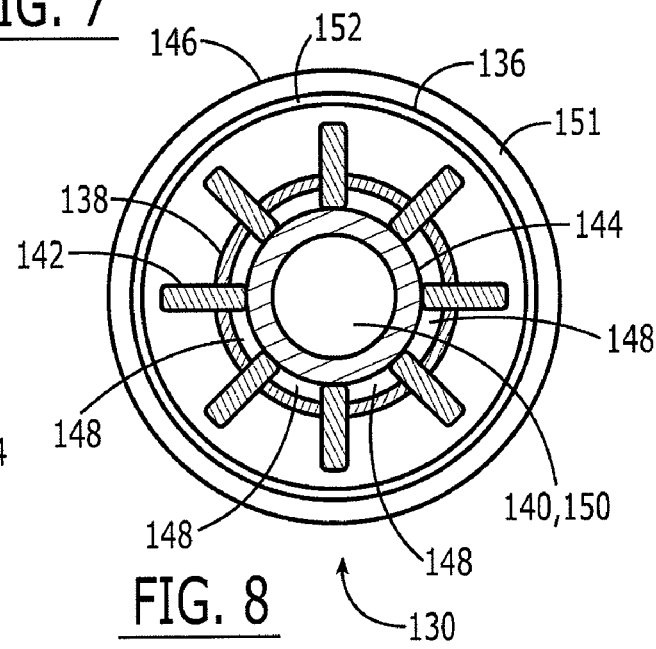
Figure 9:
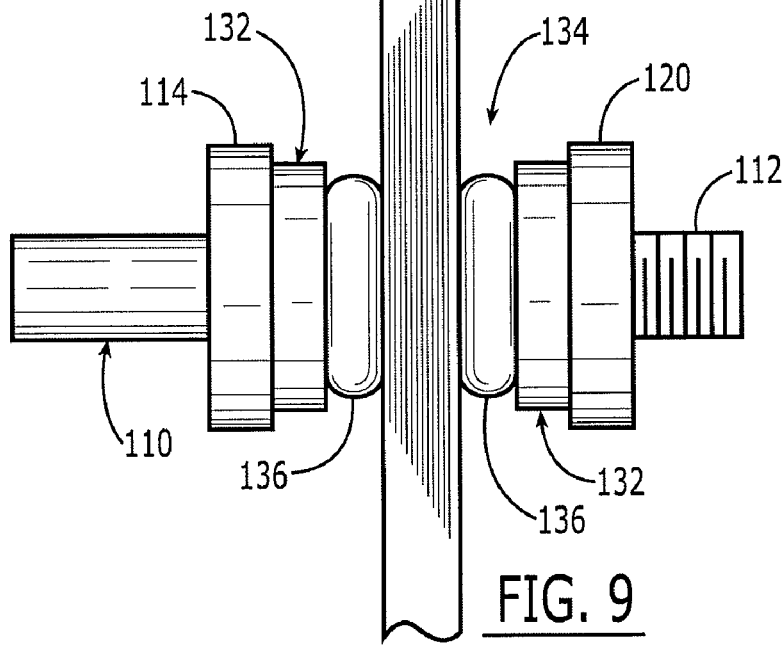

Having thus described the invention in general terms, reference will now be made to the accompanying drawings, which are not necessarily drawn to scale, and wherein:

FIG. 1 is a perspective fragmentary view of an airplane including a conduit passing through the fuselage panel, the conduits being supported by a fitting constructed in accordance with an embodiment of the present invention;

FIG. 2 is a perspective fragmentary view of a portion of fuselage panel having a conduit passing therethrough and supported by a fitting constructed in accordance with an embodiment of the present invention;

FIG. 3 is a perspective view of the fitting of FIG. 2 isolated from the fuselage panel;

FIG. 4 is an exploded perspective view of the fitting of FIG. 3;

FIG. 5 is a perspective view of the isolator assembly, including the bushings and grommet, of the fitting of FIG. 3;

FIG. 6 is an exploded perspective view of the isolator assembly of FIG. 5;

FIG. 7 is a cross-sectional view taken along line 7-7 of FIG. 6, showing the structure of the grommet;

FIG. 8 is a cross-sectional view taken along line 8-8 of FIG. 5, showing the coupling of the bushing and grommet; and FIG. 9 is a side elevational view of a fuselage panel and a fitting in accordance with an embodiment of the present invention with the fuselage panel and the fitting having been assembled together.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIGS. 1 and 2, fragmentary views are provided of an air vehicle 100, such as an airplane, constructed in accordance with an embodiment of the present invention. The air vehicle 100 has a fuselage 102 defined by and constructed of a fuselage panel 104. The fuselage panel may be formed of various materials, and in one embodiment the fuselage panel through which the conduit passes may be comprised of composite materials, such as carbon fiber reinforced plastic. A conduit 106 extends from inside the fuselage 102, through the fuselage panel 104, to outside the air vehicle. A fitting 110 is disposed between the fuselage panel 104 and conduit 106, the fitting 110 acting to support the conduit 106.

Referring to FIGS. 3 and 4, therein is shown the fitting 110 of FIG. 1, but now without the fuselage panel for the purpose of clarity. Fitting 110 includes isolator assembly 130. Referring to FIGS. 4-7, the isolator assembly includes a pair of bushings 132 and a grommet 134. The grommet 134 has annular first and second end sections 136, with an annular wall 138 extending between the end sections 136. The end sections 136 and wall 138 together define a bore 140 that extends through the grommet. The wall 138 is typically disposed between the inner and outer perimeters of the end sections 136, such that the inner dimensions of each end section is smaller than the inner dimensions of the wall, and the outer dimensions of each end section is greater than the outer dimensions of the wall. A plurality of ribs 142 protrude from the wall 138, the ribs 142 being distributed circumferentially around the wall 138. Typically, the ribs are spaced evenly about the wall, although unequal spacing and/or different rib shapes may be employed if desired. In one example, a cylindrical wall includes 12 ribs spaced every 30 degrees about the circumference of the wall. Each rib 142 spans the distance between the end sections 136 and protrudes from the wall 138 enough to extend into the bore 140.

The bushings 132 may have narrower liner sections 144 that extend into the bore 140 defined by the grommet 134 from opposing directions. The liner sections 144 mate within the bore 140 such that the liner sections 144 form a more or less continuous tubular liner. The bushings 132 may also have wider portions 146 that extend from each end of the bore 140 and abut the first and second end sections 136. The bushings 132 are generally tubular, such that when the bushings 132 mate, they define a lumen 150. The lumen 150 serves to accommodate a conduit, as discussed below. The wider portions of the bushings may include a lip 151 that surrounds an end section of the grommet and discourages lateral movement of the grommet.

Bushings 132 may be comprised of thermoplastic material, such as polyetheretherketone (PEEK), polyamide, or polyimide, which allows the bushings to insulate the threaded pipe. In some embodiments, the bushings are constructed of material or materials with low thermal conductivity and high heat resistance. This allows the bushings to act as intermediaries between any higher temperature bodies and parts, such as a fuselage wall, that are intended to be shielded from elevated temperatures.

Referring to FIG. 8, when the liner sections 144 of bushings 132 extend into bore 140, some, if not all, of the liner sections 144 come in contact with ribs 142. As such, a series of pockets 148 are formed circumferentially around the isolator assembly 130, each pocket 148 being defined by adjacent ribs 142, the end sections 136 of the grommet 134, the annular wall 138, and the liner section 144 of the bushing 132.

Referring again to FIGS. 3 and 4, in addition to the isolator assembly, a fitting can include a conduit, such as threaded pipe 112 having an abutment 114. Threaded pipe 112 is accommodated in the lumen 150 of the liner formed by the bushings 132. The threaded pipe 112 could be part of and serve as the conduit 106 (FIG. 2), could attach to other structures such that the pipe 112 and other structures together form conduit 106, or could further accommodate another conduit therein. A hex nut 120 is screwed onto the threaded pipe 112, thereby containing the isolator assembly between the abutment and nut. In one embodiment, the threaded pipe and nut are made of titanium. The threaded pipe 112 may extend through titanium exterior washers 116, interior washers 118, which are also contained by nut and abutment. In one embodiment, the exterior washers are made of titanium and the interior washers are made of a structural composite material rated for use at elevated temperatures.

Referring to FIGS. 2 and 9, fitting 110 is assembled with fuselage panel 104 such that panel 104 is accommodated between the first and second end sections 136 of the grommet 134. Components of fitting 110 are then distributed somewhat symmetrically on either side of panel 104. In one embodiment, bushings 132 extend from opposing ends of grommet 134, and interior and exterior washers 116, 118 sit in series with the grommet 134 and bushings 132. Threaded pipe 112 extends through the washers 116, 118 and the lumen 150 defined by the bushings 132, such that abutment 114 contacts an exterior washer 118 on one side of panel 104 and threaded pipe 112 extends beyond the exterior washer 118 on the opposing side of panel 104. Nut 120 is screwed onto threaded pipe 112, and as nut 120 is screwed down threaded pipe 112 and contacts exterior washer 118, the washers 116, 118, isolator fitting 130, and panel 104 are all compressed between abutment 114 and nut 120. In this way, the first and second end sections 136 are compressed against opposing sides of the fuselage panel 104, thereby substantially preventing gas from passing between the fitting 110 and said fuselage panel 104. The first and second end sections 136 may include raised features 152 configured to enhance the seal with panel 104. Bushings may be constructed of a material that also has a high load carrying capacity to help in maintaining the integrity of the bushings as nut 120 is screwed onto threaded pipe 112 and isolator fitting 130 is compressed.

In its assembled state, fitting 110, through placement of the grommet 134 between the conduit 106 and the fuselage panel 104, serves to at least partially isolate the fuselage panel 104 from both the thermal and mechanical (e.g., vibrational) energy being transmitted along the conduit 106. The grommet may include a thin annular wall that is easily deformed. For example, a grommet constructed of ethylene propylene diene monomer rubber may have a wall thickness of 0.20 in. As such, significant deformations of the grommet by the conduit are required to produce non-negligible forces on the panel. Further, the grommet contacts the bushings only at the ribs, and as such, the amount of thermal energy transferred via conduction from the conduit through the bushing to the grommet is reduced. In the areas between the ribs, the grommet and bushing create a series of pockets that trap air and serve to insulate the conduit contained inside the bushing.

In one embodiment, grommet is made of an elastomeric material. Due to the relatively low elastic modulus of this material, its ability to dissipate mechanical energy internally, and its low thermal conductivity, use of an elastomeric material enhances the ability of the grommet to provide mechanical and thermal insulation between the conduit and panel. In a particular embodiment, the grommet is composed of an elastomeric material that is resistant to attack by hydraulic fluid, such as ethylene propylene diene monomer.

Many modifications and other embodiments of the invention will come to mind to one skilled in the art to which this invention pertains having the benefit of the teachings presented in the foregoing descriptions and the associated drawings. For example, while the previous embodiments have pertained to an air vehicle, embodiments of the present invention are applicable to any system in which a panel is penetrated by a body transmitting heat or vibrations, and specifically can be applied to other types of vehicles or structures. Also, in some embodiments, the sections of the grommet that border the annular wall are not end sections, but rather some other sections adjacent to neither or only one end of the grommet. In some embodiments, the ribs of the grommet contact the fuselage panel, thereby establishing a series of air pockets between the grommet and panel that further insulate the panel. In yet other embodiments, the grommet and/or fitting are not round or cylindrical, as shown, but instead are other shapes in cross section (e.g., a square annulus, a triangular annulus, or an irregular annulus), or are only partially annular. Finally, in other embodiments, the components making up the fitting are not distributed symmetrically on either side of the fuselage panel when the fitting and panel are assembled, but are arranged in one of a variety of ways that suit the application.

Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fitting for supporting a conduit penetrating a panel and limiting energy transfer between the conduit and panel, the fitting comprising:
    a grommet having
        annular first and second sections spaced apart from one another;
        an annular wall extending between said first and second sections, said wall and first and second sections defining a bore; and
        a plurality of ribs protruding from and distributed circumferentially around said annular wall, said ribs spanning between said first and second sections and extending into the bore; and
    a tubular liner extending through the bore of said grommet and contacting said first and second sections and at least some of said plurality of ribs.

2. A fitting according to claim 1, wherein said first and second sections extend radially beyond said wall and include raised features configured to sealingly mate with a panel disposed therebetween.

3. A fitting according to claim 1, wherein said grommet is comprised of elastomeric material.

4. A fitting according to claim 1, wherein said ribs, said liner, and said first and second sections together define a series of pockets that substantially prevent gas flow into and out of the pockets.

5. A fitting according to claim 1, wherein said liner is comprised of thermoplastic material.

6. A fitting according to claim 1, wherein the ribs of said plurality of ribs are equally spaced.

7. A fitting according to claim 1, wherein said liner includes opposing first and second liner parts, said liner parts mating within the bore and including wider portions extending from respective ends of the bore, the wider portions abutting, respectively, said first and second sections.

8. A fitting according to claim 7, wherein the bore defines an axis and at least one of the wider portions of said liner parts includes at least one lip that at least partially surrounds and discourages off-axis translation of said grommet.

9. An air vehicle comprising:
    a fuselage having a fuselage panel;
    at least one conduit extending from one side of said fuselage panel to an opposing side of said fuselage panel such that the conduit penetrates through said fuselage panel; and
    a fitting disposed between said fuselage panel and said conduit, said fitting including
        a grommet having
            annular first and second sections and spaced apart from one another;
            an annular wall extending between said first and second sections, said wall and first and second sections defining a bore and said first and second sections extending beyond said wall and accommodating said fuselage panel therebetween; and
            a plurality of ribs protruding from and distributed circumferentially around said annular wall, said ribs spanning between said first and second sections and extending into the bore; and
        a tubular liner extending through the bore of said grommet and contacting said first and second sections and at least some of said plurality of ribs, said tubular liner defining a lumen that accommodates said conduit.

10. An air vehicle according to claim 9, wherein said grommet is configured to dissipate vibrational energy passing from said conduit to said fuselage panel.

11. An air vehicle according to claim 9, wherein said first and second sections extend beyond said wall and include raised features configured to sealingly mate with a panel disposed therebetween.

12. An air vehicle according to claim 9, wherein said grommet is comprised of elastomeric material.

13. An air vehicle according to claim 9, wherein said ribs, said liner, and said first and second sections together define a series of pockets that substantially prevent gas flow into and out of the pockets.

14. An air vehicle according to claim 9, wherein said liner is comprised of thermoplastic material.

15. An air vehicle according to claim 9, wherein said liner includes opposing first and second liner parts, said liner parts mating within the bore and including wider portions extending from respective ends of the bore, the wider portions abutting, respectively, said first and second sections.

16. An air vehicle according to claim 15, wherein the bore defines an axis and at least one of the wider portions of said liner parts includes at least one lip that at least partially surrounds and discourages off-axis translation of said grommet.

17. An air vehicle according to claim 9, wherein said fitting is configured to compress said first and second sections and said fuselage wall, thereby substantially preventing gas from passing between said fitting and said fuselage panel.

18. An air vehicle according to claim 17, wherein said fitting further includes:
   a threaded pipe, the pipe extending through the lumen and having an abutment, and
   a matingly threaded nut coupled to said pipe and opposing said abutment such that said first second sections and said fuselage wall are compressed between said abutment and nut.

19. An air vehicle according to claim 18, wherein said fitting further includes one or more washers disposed around said pipe and between said abutment and nut.

20. A grommet for use in a fitting for supporting a conduit and limiting energy transfer from the conduit, the grommet comprising:
   opposing annular first and second sections;
   an annular wall extending between said first and second sections, said wall and first and second sections defining a bore; and
   a plurality of ribs protruding from and distributed circumferentially around said annular wall, said ribs spanning between said first and second sections and extending into the bore,
   and wherein said first and second sections and said ribs are configured to define a series of pockets that substantially prevent gas flow into and out of the pockets when a tubular body extends through the bore and contacts said first and second sections and at least some of said plurality of ribs.

21. A grommet according to claim 20, wherein said first and second sections extend beyond said wall and include raised features configured to sealingly mate with a panel disposed therebetween.

22. A grommet according to claim 20, wherein said grommet is comprised of elastomeric material.

23. A method for supporting a conduit penetrating a panel and limiting energy transfer between the conduit and panel, the method comprising:
   providing a grommet having annular first and second sections spaced apart from one another, an annular wall extending between said first and second sections with said wall and first and second sections defining a bore, and a plurality of ribs protruding from and distributed circumferentially around said annular wall, said ribs spanning between said first and second sections and extending into the bore;
   extending a tubular liner through the bore of said grommet and contacting said first and second sections and at least some of said plurality of ribs; and
   mounting the grommet to the panel to support penetration of the panel by a conduit.

24. A method according to claim 23, wherein said first and second sections extend radially beyond said wall and include raised features, and wherein mounting the grommet comprises sealingly mating the raised features with the panel disposed therebetween.

* * * * *